United States Patent
Yoshihara et al.

(10) Patent No.: US 7,621,172 B2
(45) Date of Patent: Nov. 24, 2009

(54) KNOCKING DETERMINATION DEVICE FOR INTERNAL COMBUSTION ENGINE

(75) Inventors: Masatomo Yoshihara, Toyota (JP); Kenji Kasashima, Nishikamo-gun (JP); Rihito Kaneko, Nishikamo-gun (JP); Koji Aso, Susono (JP); Kenji Senda, Okazaki (JP); Shigeru Kamio, Nagoya (JP); Yuichi Takemura, Anjo (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 475 days.

(21) Appl. No.: 11/471,682

(22) Filed: Jun. 21, 2006

(65) Prior Publication Data

US 2007/0000307 A1    Jan. 4, 2007

(30) Foreign Application Priority Data

Jun. 30, 2005    (JP)    ............................... 2005-192038

(51) Int. Cl.
G01L 23/22    (2006.01)
(52) U.S. Cl. .................................................. 73/35.06
(58) Field of Classification Search ........................ None
See application file for complete search history.

(56) References Cited

U.S. PATENT DOCUMENTS

| | | | | |
|---|---|---|---|---|
| 4,316,440 | A | * | 2/1982 | Yamaguchi et al. ......... 73/35.09 |
| 4,493,776 | A | * | 1/1985 | Rhodes ........................ 508/287 |
| 4,881,401 | A | * | 11/1989 | Cockerham ................. 73/35.03 |
| 5,115,779 | A | * | 5/1992 | Itoyama ................. 123/406.35 |
| 5,400,644 | A | | 3/1995 | Remboski, Jr. et al. |
| 5,460,031 | A | * | 10/1995 | Fujishita et al. ............ 73/35.03 |
| 5,608,633 | A | * | 3/1997 | Okada et al. ................ 701/111 |
| 6,947,829 | B2 | * | 9/2005 | Honda ........................ 701/111 |
| 2004/0204814 | A1 | | 10/2004 | Honda |
| 2005/0251320 | A1 | | 11/2005 | Kasashima et al. |

FOREIGN PATENT DOCUMENTS

| | | |
|---|---|---|
| EP | 0 421 952 A1 | 4/1991 |
| GB | 2 245 382 A | 1/1992 |

(Continued)

OTHER PUBLICATIONS

U.S. Appl. No. 11/313,741, filed Dec. 22, 2005.

(Continued)

*Primary Examiner*—Robert R Raevis
(74) *Attorney, Agent, or Firm*—Oblon, Spivak, McClelland, Maier & Neustadt, L.L.P.

(57) ABSTRACT

An engine ECU 200 includes a bandpass filter (1), a bandpass filter (2), and a bandpass filter (3). The bandpass filter (1) extracts only vibrations at a first frequency band A from the vibrations detected by a knock sensor. The bandpass filter (2) extracts only vibrations at a second frequency band B from the vibrations detected by the knock sensor. The bandpass filter (3) extracts only vibrations at a third frequency band C from the vibrations detected by the knock sensor. The first to third frequency bands A-C are identical in bandwidth. The engine ECU calculates a peak value in magnitude of vibrations in a synthesized waveform of these frequency bands, and determines whether knocking occurred or not based on the peak value.

3 Claims, 8 Drawing Sheets

FOREIGN PATENT DOCUMENTS

| | | |
|---|---|---|
| JP | 57-146121 | 9/1982 |
| JP | 7-109949 | 4/1995 |
| JP | 8-326594 | 12/1996 |
| JP | 10-205386 | 8/1998 |
| JP | 2001-227400 | 8/2001 |
| JP | 2002-47993 | 2/2002 |

OTHER PUBLICATIONS

U.S. Appl. No. 11/475,993, filed Jun. 28, 2006, Yoshihara et al.

* cited by examiner

KNOCKING DETERMINATION DEVICE FOR INTERNAL COMBUSTION ENGINE

This nonprovisional application is based on Japanese Patent Application No. 2005-192038 filed with the Japan Patent Office on Jun. 30, 2005, the entire contents of which are hereby incorporated by reference.

BACKGROUND OF THE INVENTION

1. Field of the Invention

The present invention relates to a knocking determination device and, more specifically, to a knocking determination device for an internal combustion engine that determines whether knocking occurred or not, based on a waveform of vibrations of the internal combustion engine.

2. Description of the Background Art

Conventionally, a technique for detecting knocking of an internal combustion engine is known. Japanese Patent Laying-Open No. 2001-227400 discloses a knock control device for an internal combustion engine that can accurately determine whether the engine knocks. The knock control device for an internal combustion engine disclosed in Japanese Patent Laying-Open No. 2001-227400 includes a signal detector detecting a signal representing a waveform of vibrations occurring in the internal combustion engine (or a vibration waveform signal), an occurrence period detector detecting a period as an occurrence period during which the vibration waveform signal detected by the signal detector assumes a predetermined value or higher, a peak position detector detecting a peak position in the occurrence period detected by the occurrence period detector, a knock determiner determining whether the internal combustion engine knocks based on the relation between the occurrence period and the peak position, and a knock controller controlling an operation state of the internal combustion engine in accordance with a determination result of the knock determiner. The knock determiner determines knock (knocking) occurs when the peak position relative to the occurrence period is in a predetermined range. The signal detector detects a prescribed frequency component particular to a knock signal as the vibration waveform signal.

According to the knock control device for an internal combustion engine disclosed in the publication, a signal representing a waveform of vibrations occurring in the internal combustion engine is detected by a signal detector. An occurrence period during which the vibration waveform signal assumes a predetermined value or higher and a peak position therein are detected by an occurrence period detector and a peak position detector, respectively. Thus, the knock determiner can determine whether the engine knocks by detecting the position of the peak in the occurrence period of the vibration waveform signal. According to the knock determination result, the operation state of the internal combustion engine is controlled. When the peak position relative to the occurrence period is in a predetermined range, that is, when a waveform has such a shape that the peak position appears earlier relative to a predetermined length of the occurrence period of the vibration waveform signal, the knock determiner recognizes it as being particular to knocking. Thus, even in a transition state where an operation state of the internal combustion engine abruptly changes or when electric loads are turned on/off, whether or not the internal combustion engine knocks is accurately determined, and the operation state of the internal combustion engine can be controlled appropriately.

While a frequency component particular to knocking is detected as the vibration waveform signal with the knock control device for an internal combustion engine disclosed in Japanese Patent Laying-Open No. 2001-227400, the frequency component particular to knocking is not constant. Accordingly, it is necessary to detect frequency components included in predetermined frequency bands. Thus, the detected frequency components may include those which are not particular to knocking. Such a problem is not considered in the knock control device for an internal combustion engine disclosed in Japanese Patent Laying-Open No. 2001-227400. Specifically, while there are several frequency bands particular to knocking, it is silent about a method for appropriately detecting frequency components particular to knocking in a plurality of frequency bands. Accordingly, some frequency bands may include great noise components. In this case, there has been a problem that the magnitude or peak of vibrations cannot be detected appropriately and the accuracy of knocking determination is deteriorated.

SUMMARY OF THE INVENTION

An object of the present invention is to provide a knocking determination device that can determine whether knocking occurred or not with high accuracy.

A knocking determination device for an internal combustion engine according to the present invention includes: a detecting unit detecting vibrations of an internal combustion engine; an extracting unit extracting, from the detected vibrations, vibrations at a plurality of frequency bands being identical in bandwidth; and a determining unit determining whether knocking occurred in the internal combustion engine or not, based on the extracted vibrations.

According to the present invention, the detecting unit detects vibrations of the internal combustion engine. The vibrations detected as the vibrations particular to knocking are detected at a plurality of frequency bands. The vibrations particular to knocking fall within a range of the median value±X (wherein X is a natural number) kHz in each frequency band, irrespective of frequency bands. Accordingly, from the vibrations, the extracting unit extracts vibrations at a plurality of frequency bands being identical in the bandwidth. This prevents the bandwidth of the frequency bands from unnecessarily increasing and suppresses detection of many noises. Therefore, vibrations particular to knocking can be detected with high accuracy. Whether knocking occurred or not is determined based on thus detected vibrations. As a result, the knocking determination device that can determine whether knocking occurred or not with high accuracy can be provided.

Preferably, the knocking determination device for an internal combustion engine further includes: a detecting unit detecting a vibration waveform with predetermined crank angle intervals, based on the extracted vibrations; and a storage unit storing in advance a vibration waveform of the internal combustion engine. The determining unit determines whether knocking occurred in the internal combustion engine or not, based on a result of comparison between the detected waveform and the stored waveform.

According to the present invention, whether knocking occurred or not can be determined based on a result of comparison between the detected waveform and the stored waveform, for example, based on a degree of matching between the detected vibration waveform and the stored waveform. Thus, whether the vibration waveform is that attributed to knocking or not can be analyzed from the behavior of the vibrations (such as attenuation trend of the vibrations), and whether knocking occurred or not can be determined with high accuracy.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
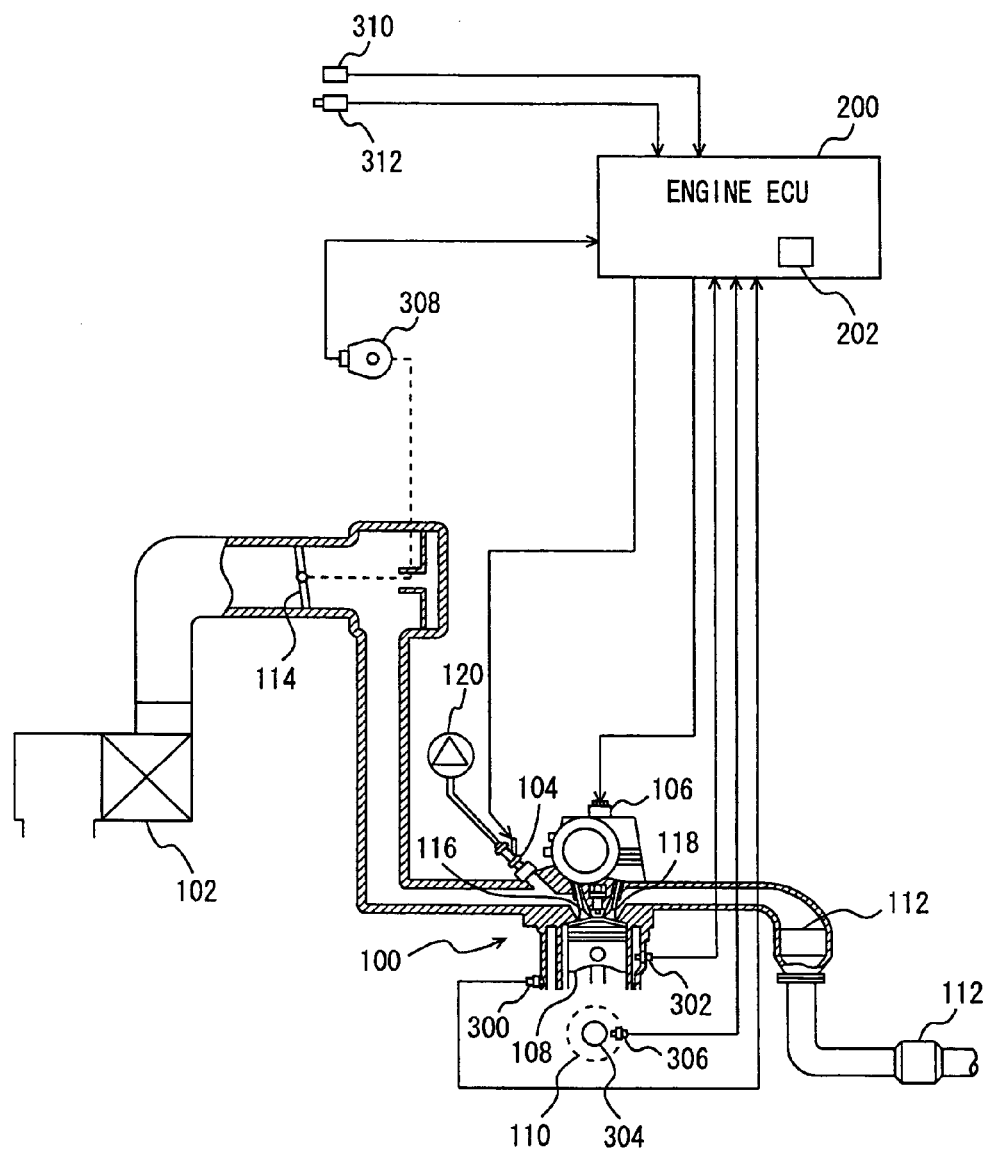
FIG. 1 is a schematic configuration diagram showing an engine controlled by a knocking determination device according to an embodiment of the present invention.

Embodiments of the present invention will be described in the following with reference to the figures. In the following description, the same components are denoted by the same reference characters. The names and functions are also the same. Therefore, detailed description thereof will not be repeated.

With reference to FIG. 1, an engine 100 of a vehicle incorporating a knocking determination device according to an embodiment of the present invention will be described. The knocking determination device of the present embodiment is implemented by a program executed, for example, by an engine ECU (Electronic Control Unit) 200.

Engine 100 is an internal combustion engine, in which a mixture of air taken through an air cleaner 102 and a fuel injected by an injector 104 is ignited by a spark plug 106 and burned in a combustion chamber.

The burning of air-fuel mixture causes combustion pressure that presses a piston 108 down, whereby a crank shaft 110 rotates. The combusted air-fuel mixture (or exhaust gas) is purified by a three-way catalyst 112 and thereafter discharged outside the vehicle. The amount of air taken into engine 100 is adjusted by a throttle valve 114.

Engine 100 is controlled by engine ECU 200 having connected thereto a knock sensor 300, a water temperature sensor 302, a crank position sensor 306 arranged opposite a timing rotor 304, a throttle opening sensor 308, a vehicle speed sensor 310, and an ignition switch 312.

Knock sensor 300 is provided at a cylinder block of engine 100. Knock sensor 300 is implemented by a piezoelectric element. As engine 100 vibrates, knock sensor 300 generates a voltage having a magnitude corresponding to that of the vibrations. Knock sensor 300 transmits a signal representing the voltage to engine ECU 200. Water temperature sensor 302 detects temperature of cooling water in engine 100 at a water jacket and transmits a signal representing the detection result to engine ECU 200.

Timing rotor 304 is provided at a crank shaft 110 and rotates as crank shaft 110 does. Timing rotor 304 is provided at its circumference with a plurality of protrusions at predetermined intervals. Crank position sensor 306 is arranged opposite the protrusions of timing rotor 304. When timing rotor 304 rotates, an air gap between the protrusions of timing rotor 304 and crank position sensor 306 varies, so that magnetic flux passing through a coil portion of crank position sensor 306 increases/decreases, thus generating electromotive force. Crank position sensor 306 transmits a signal representing the electromotive force to engine ECU 200. From the signal transmitted from crank position sensor 306, engine ECU 200 detects a crank angle.

Throttle opening sensor 308 detects a throttle open position and transmits a signal representing a detection result to engine ECU 200. Vehicle speed sensor 310 detects number of rotation of a wheel (not shown) and transmits a signal representing a detection result to engine ECU 200. From the number of rotation of the wheel, engine ECU 200 calculates the vehicle speed. Ignition switch 312 is turned on by a driver, for starting engine 100.

Engine ECU 200 uses the signals transmitted from each sensor and ignition switch 312 as well as a map and program stored in a memory 202 to perform an operation to control equipment so that engine 100 attains a desired driving condition.

In the present embodiment, using a signal transmitted from knock sensor 300 and a crank angle, engine ECU 200 detects a waveform of vibrations of engine 100 at a predetermined knock detection gate (a section from a predetermined first crank angle to a predetermined second crank angle) (hereinafter such a waveform of vibrations will also be referred to as a "vibration waveform") and from the detected vibration waveform determines whether engine 100 knocks. The knock detection gate of the present embodiment is from the top dead center (0°) to 90° in a combustion stroke. It is noted that the knock detection gate is not limited thereto.

Figure 2:
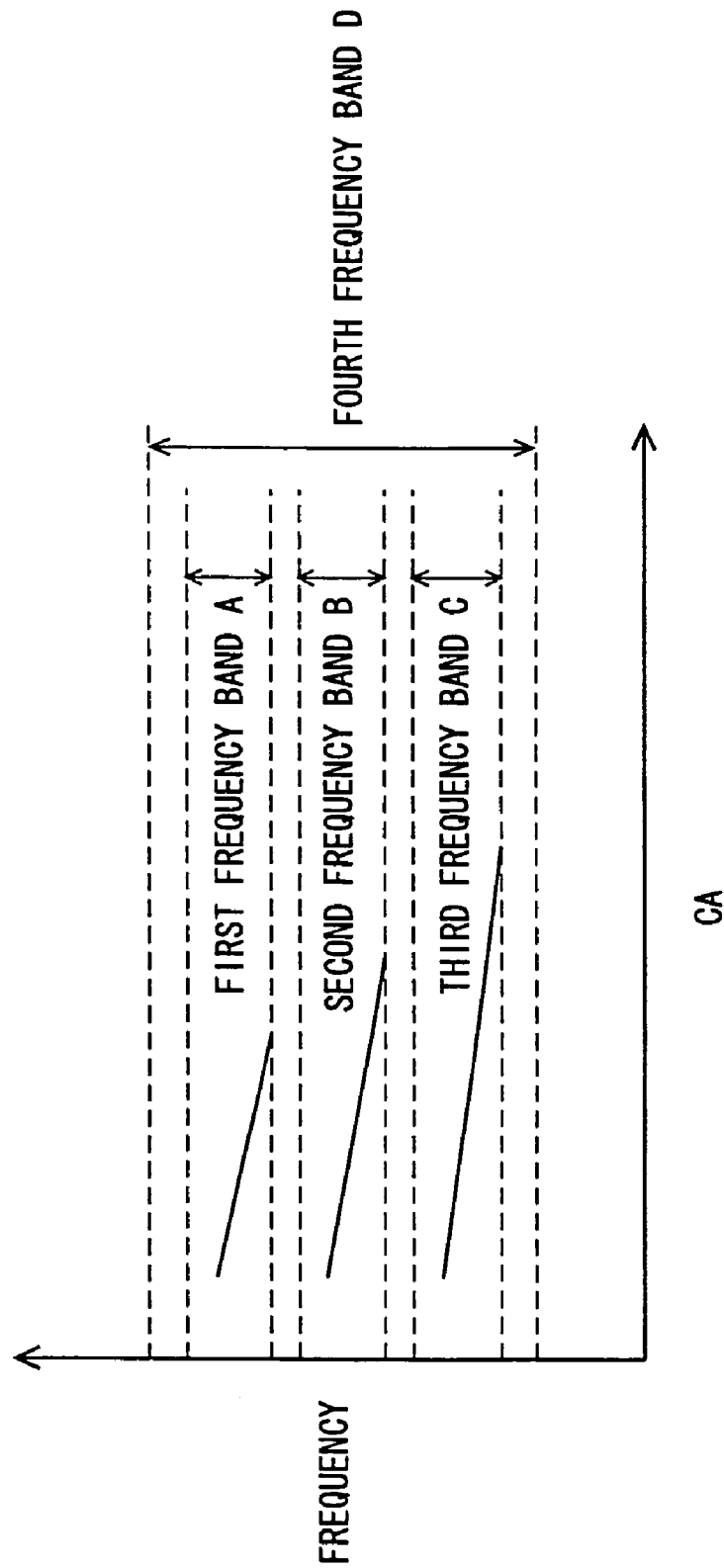
FIG. 2 is a diagram representing frequencies of vibrations occurring in the engine.

When the engine knocks, vibrations occur in engine 100 at frequencies around the frequencies represented by solid lines in FIG. 2. The frequencies of the vibrations attributed to knocking are not constant, and have a prescribed bandwidth. Accordingly, in the present embodiment, as shown in FIG. 2, vibrations included in a first frequency band A, a second frequency band B and a third frequency band C are detected. In FIG. 2, CA represents a crank angle. The number of frequency bands of vibrations attributed to knocking is not limited to three.

Here, when the bandwidth of each frequency band is set to a fixed ratio width, which is set to be increased as the frequency band is higher, noises other than vibrations attributed to knocking (for example, vibrations of an in-cylinder injector or those attributed to seating of an intake/exhaust valve) may highly possibly be included, in particular at high-frequency bands.

Figure 3:
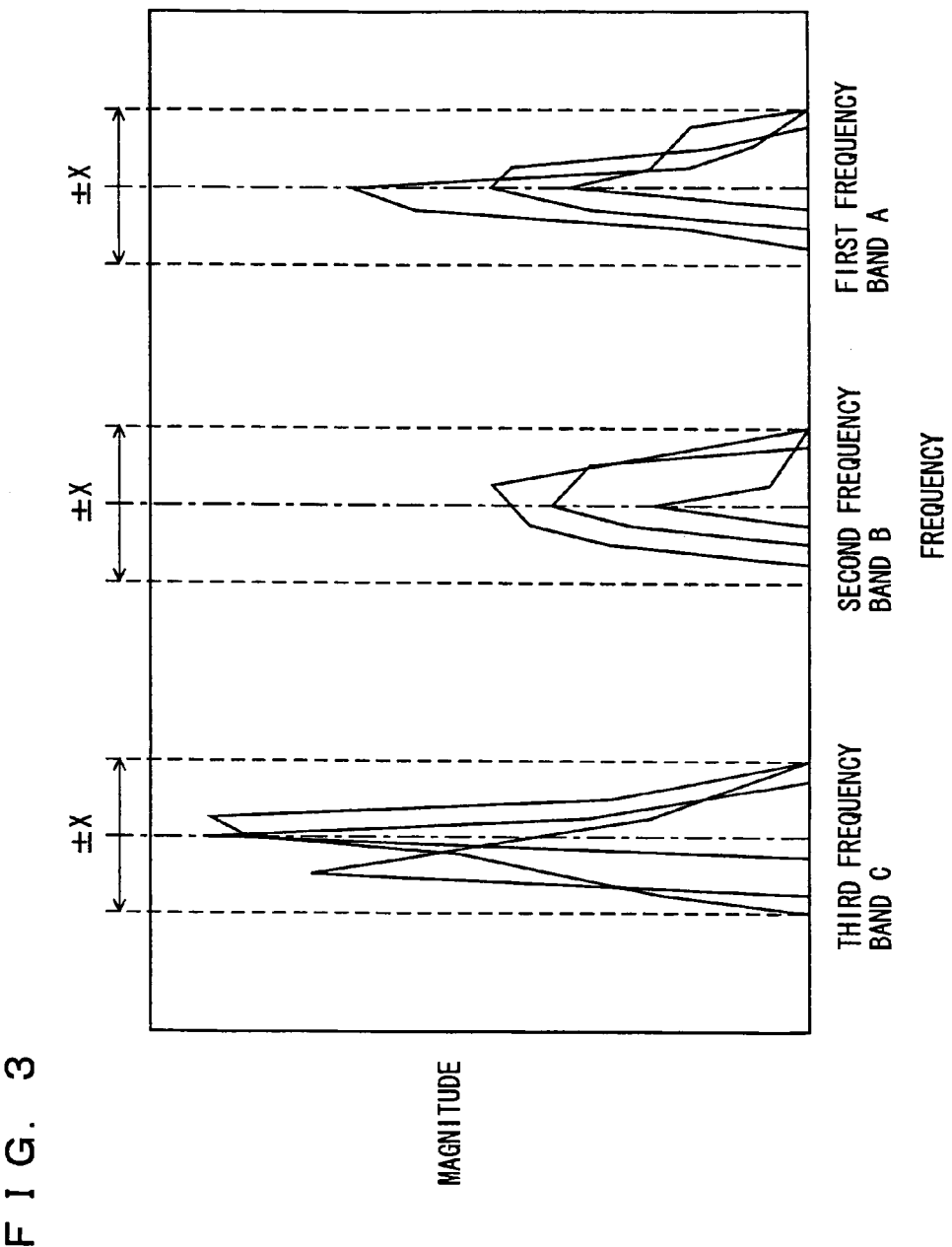
FIG. 3 is a diagram representing frequencies of vibrations occurring in a cylinder block when knocking occurs.

However, as shown in FIG. 3, vibrations appearing in each frequency band when the engine knocks fall within a range of the median value of each frequency band±X (wherein X is a natural number) kHz. Accordingly, in the present embodiment, first frequency band A, second frequency band B and third frequency band C are set to have a bandwidth of a fixed value so that the bandwidth is the same irrespective of the frequency bands, and then vibrations are detected. The bandwidth is set to be within 2×X kHz. As will be described later, the vibrations at first frequency band A, second frequency band B and third frequency band C are used to calculate a peak value in magnitude of vibrations.

Further, in the present embodiment, when noises occur, in order to determine whether knocking occurred or not taking the noises into consideration, vibrations in a fourth frequency band D that is broad and that includes first to third frequency bands A-C are detected, so as to include the noises. As will be described later, the vibrations of fourth frequency band D are used to detect a vibration waveform of engine 100.

Figure 4:
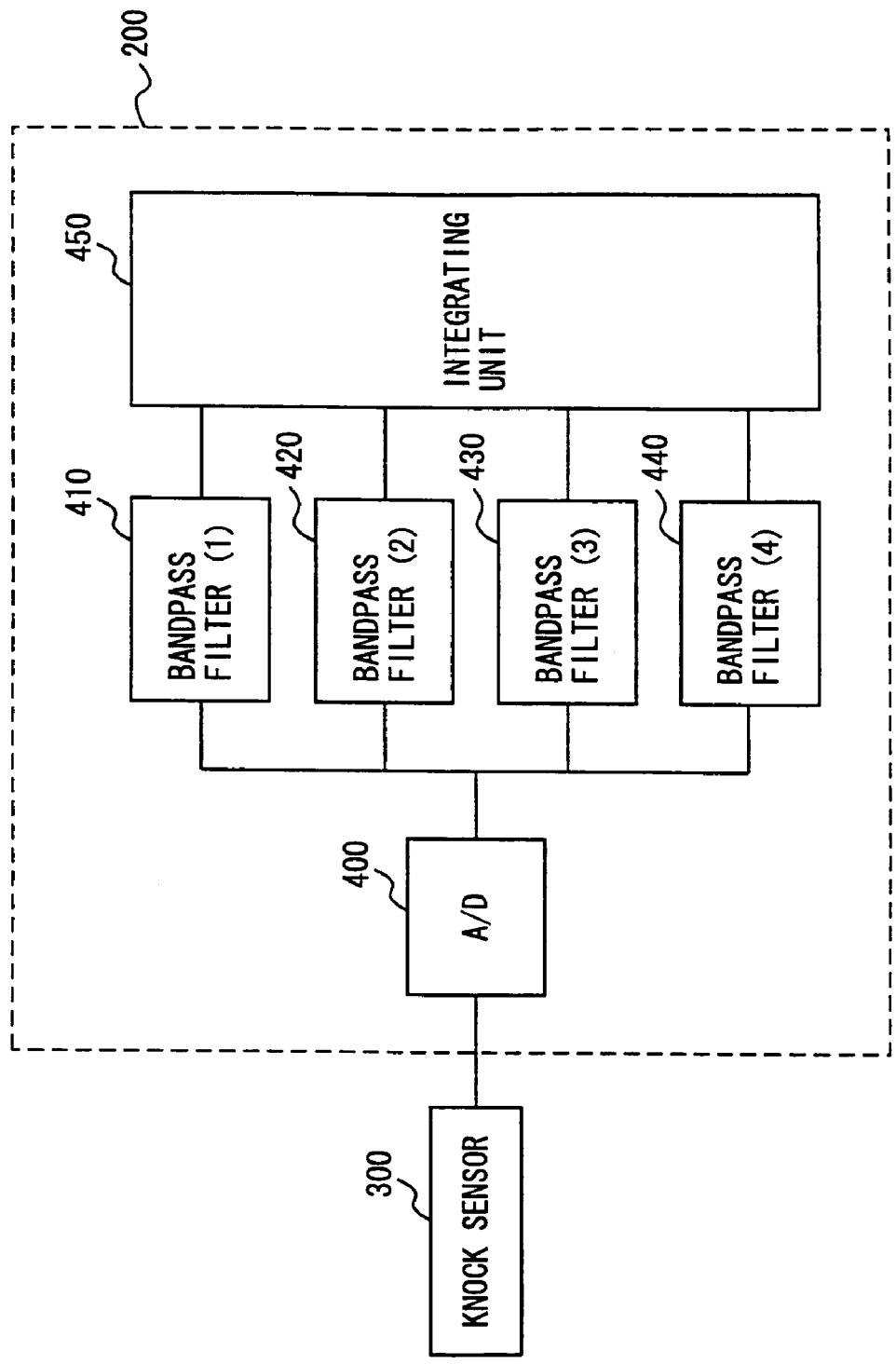
FIG. 4 is a control block diagram showing an engine ECU.

Referring to FIG. 4, engine ECU 200 will further be described. Engine ECU 200 includes an A/D (analog/digital) converter 400, a bandpass filter (1) 410, a bandpass filter (2) 420, a bandpass filter (3) 430, a band pass filter (4) 440, and an integrating unit 450.

A/D converter 400 converts an analog signal transmitted from knock sensor 300 into a digital signal. Bandpass filter (1) 410 allows only a signal at first frequency band A to pass among the signals transmitted from knock sensor 300. That is, from the vibrations detected by knock sensor 300, only the vibrations at first frequency band A are extracted by bandpass filter (1) 410.

Bandpass filter (2) 420 allows only a signal of second frequency band B to pass among the signals transmitted from knock sensor 300. That is, from the vibrations detected by knock sensor 300, only the vibrations at second frequency band B are extracted by bandpass filter (2) 420.

Bandpass filter (3) 430 allows only a signal of third frequency band C to pass among the signals transmitted from knock sensor 300. That is, from the vibrations detected by knock sensor 300, only the vibrations at third frequency band C are extracted by bandpass filter (3) 430.

Bandpass filter (4) 440 allows only a signal of fourth frequency band D to pass among the signals transmitted from knock sensor 300. That is, from the vibrations detected by knock sensor 300, only the vibrations of fourth frequency band D are extracted by bandpass filter (4) 440.

Integrating unit 450 integrates the signals, that is, the magnitude of vibrations, selected by bandpass filter (1) 410-bandpass filter (4) 440 for a crank angle of every five degrees. In the following, the value obtained by such an integration is also referred to as an integrated value. The integrated values are calculated for each frequency band.

Of the calculated integrated values, the integrated values of first to third frequency bands A-C are added in correspondence with the crank angles. That is, a vibration waveform of the first to third frequency bands A to C is synthesized. Additionally, the integrated values of fourth frequency band D are used as a vibration waveform of engine 100.

Figure 5:
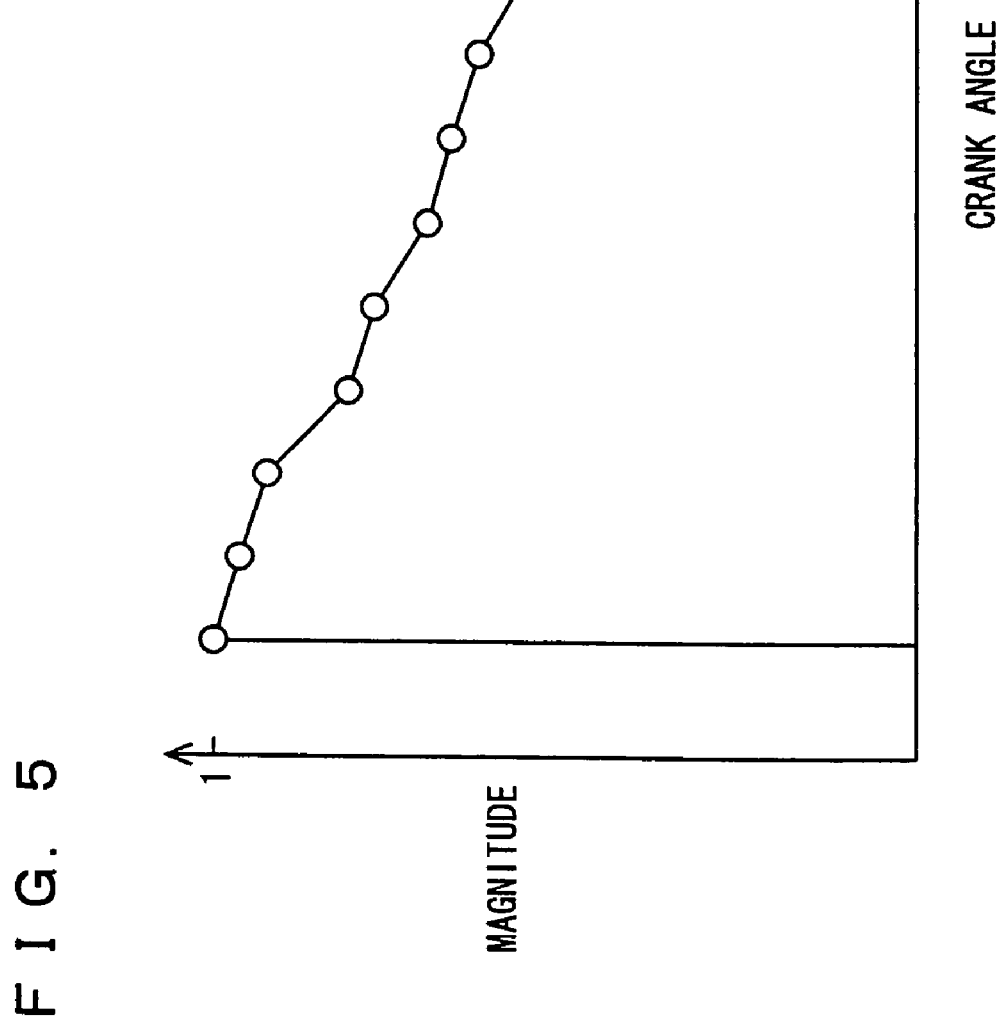
FIG. 5 is a diagram representing a knock waveform model stored in a memory of the engine ECU.

The vibration waveform detected by the integrated values of fourth frequency band D is compared with a knock waveform model shown in FIG. 5, and whether knocking occurred or not is determined. The knock waveform model is a model vibration waveform when engine 100 knocks. The knock waveform model is stored in memory 202 of engine ECU 200.

In the knock waveform model, magnitude of vibrations is represented by a dimensionless number of 0 to 1 and does not uniquely correspond to a crank angle. More specifically, for the knock waveform model of the present embodiment, while it is determined that the vibrations decrease in magnitude as the crank angle increases after the peak value in magnitude of vibrations, the crank angle at which the vibration magnitude assumes the peak value is not determined.

The knock waveform model of the present embodiment corresponds to the vibrations after the peak value in the magnitude of the vibrations occurred by knocking. A knock waveform model that corresponds to vibrations after the rise of the vibrations attributed to knocking may be stored.

The knock waveform model is obtained as follows: an experiment or the like is conducted to force knocking of engine 100, and the vibration waveform of engine 100 is detected, based on which the knock waveform model is created and stored in advance. It should be noted, however, that the models might be created by a different method.

Figure 6:
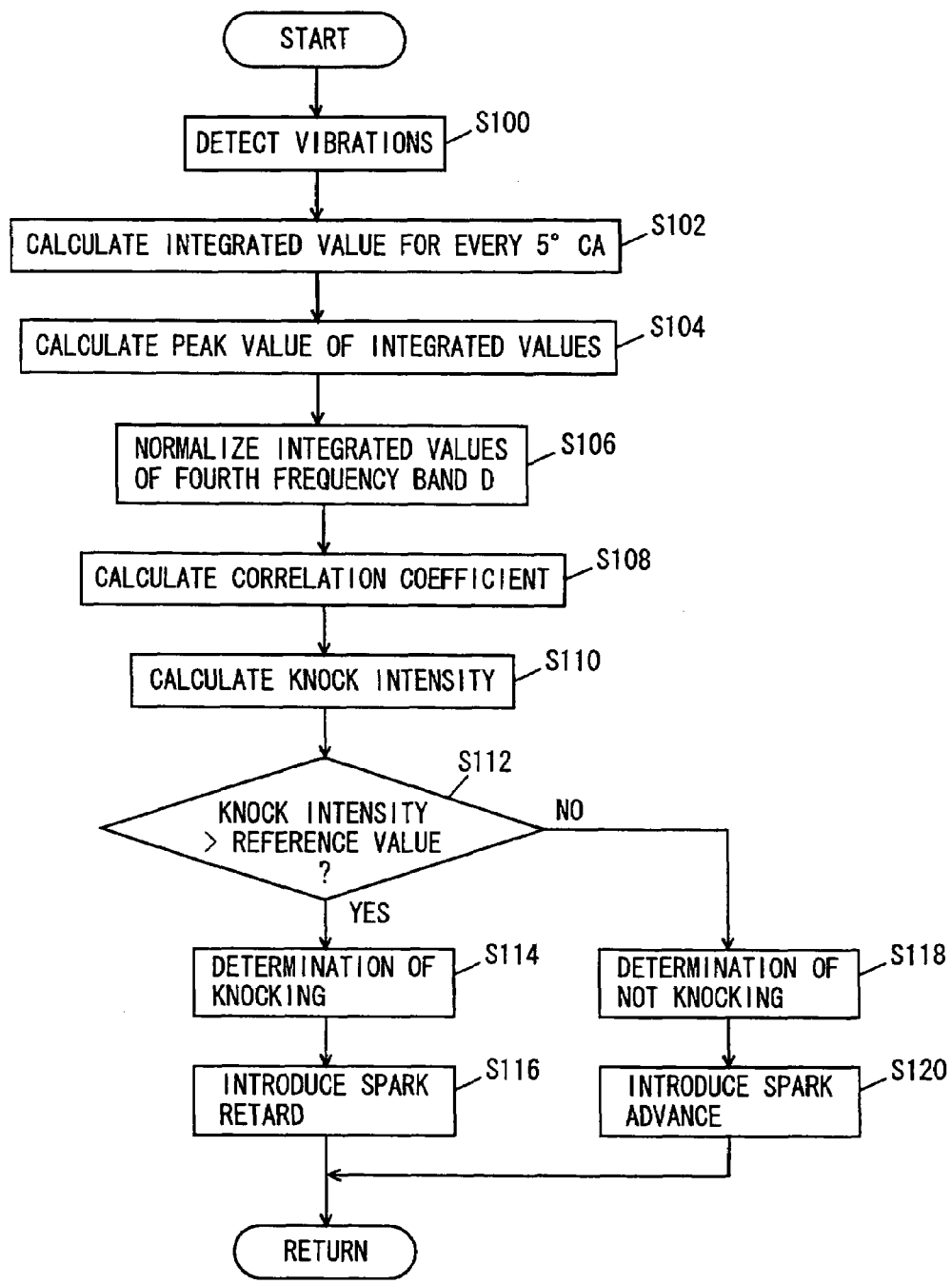
FIG. 6 is a flowchart illustrating a control structure of a program executed by the engine ECU.

Referring to FIG. 6, the control structure of the program executed by engine ECU 200 in the knocking determination device in accordance with the present embodiment will be described.

At step (hereinafter simply referred to as "S") 100, engine ECU 200 detects the vibration magnitude of engine 100 based on a signal transmitted from knock sensor 300. The vibration magnitude is represented by a value of voltage output from knock sensor 300. Note that the vibration magnitude may be represented by a value corresponding to the value of the voltage output from knock sensor 300. The vibration magnitude is detected in a combustion stroke for an angle from a top dead center to (a crank angle of) 90°.

At S102, engine ECU 200 calculates for a crank angle of every five degrees an integration (an "integrated value") of values of voltage output from knock sensor 300 (i.e., representing magnitude of vibrations). The integrated values are calculated for vibrations of each of the first to fourth frequency bands A to D. Here, integrated values of first to third frequency bands A-C are added in correspondence with crank angles (i.e., a waveform is synthesized). Further, the integrated values of fourth frequency band D are calculated, whereby the vibration waveform of engine 100 is detected.

At S104, engine ECU 200 calculates the largest of the integrated values (the peak value) in the synthesized waveform of first to third frequency bands A-C. At S106, engine ECU 200 normalizes the integrated values of fourth frequency band D (the vibration waveform of engine 100). Here, the normalization means division of each integrated value by the largest of the integrated values to represent the vibration magnitude by a dimensionless number of 0 to 1.

At S108, engine ECU 200 calculates a coefficient of correlation K, which is a value related to a deviation between the normalized vibration waveform and the knock waveform model. In a state where a timing at which the magnitude of the vibrations becomes maximum in the normalized vibration waveform and a timing at which the magnitude of the vibrations becomes maximum in the knock waveform model are matched, a deviation in absolute value (or an amount of offset) between the normalized vibration waveform and the knock waveform model is calculated for each crank angle (of five degrees), whereby the coefficient of correlation K is obtained.

When we represent the absolute value of deviation between the normalized vibration waveform and the knock waveform model for each crank angle by $\Delta S(I)$ (wherein I is a natural number) and the vibration magnitude of knock waveform model integrated by the crank angle (i.e., the area of knock waveform model) by S, then the coefficient of correlation K is calculated by an equation $K=(S-\Sigma \Delta S(I))/S$, where $\Sigma \Delta S$ (I) represents a sum of $\Delta S(I)$s. Note that the coefficient of correlation K may be calculated by a different method.

At S110, engine ECU 200 calculates a knock intensity N. When we represent the calculated peak value by P and the value representing the magnitude of vibrations of engine 100 while engine 100 is not knocking by BGL (Back Ground Level), the knock intensity N is calculated by the equation $N=P \times K/BGL$. The BGL is stored in memory 202. Note that knock intensity N may be calculated by a different method.

At S112, engine ECU 200 determines whether knock intensity N is larger than a predetermined reference value. If the knock intensity N is larger than the predetermined reference value (YES at S112), the control proceeds to S114. Otherwise (NO at S112), the control proceeds to S118.

At S114, engine ECU 200 determines that engine 100 knocks. At S116 engine ECU 200 introduces a spark retard. At S118 engine ECU 200 determines that engine 100 does not knock. At S120 engine ECU 200 introduces a spark advance.

An operation of engine ECU 200 of the knocking determination device according to the present embodiment based on the above-described configuration and flowchart will be described.

When a driver turns on ignition switch 312 and engine 100 starts, vibration magnitude of engine 100 is detected from a signal transmitted from knock sensor 300 (S100).

Figure 7:
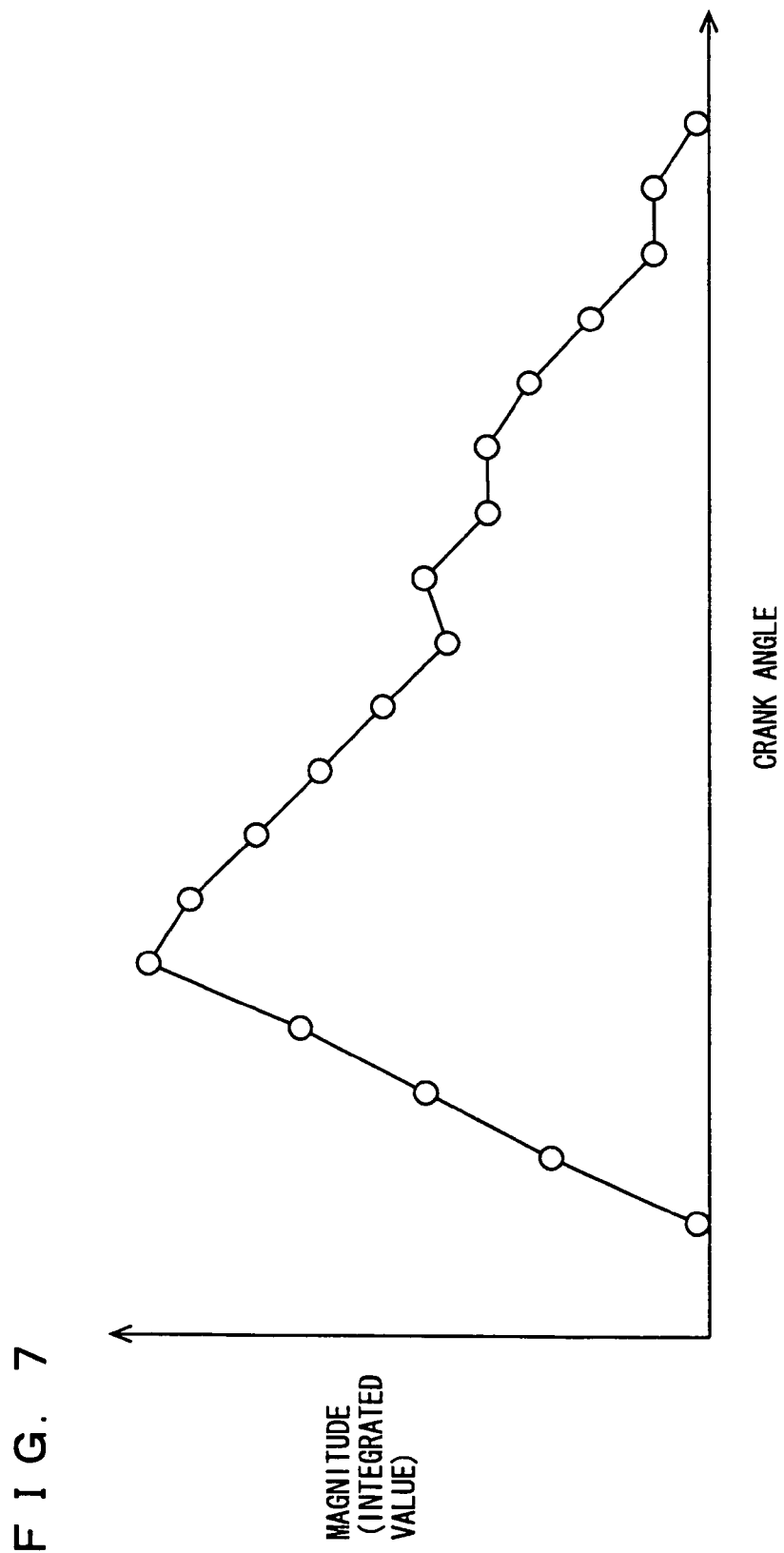
FIG. 7 is a diagram representing a vibration waveform before normalization.

In a combustion stroke for a range from the top dead center to 90°, an integrated value for every five degrees is calculated for respective vibrations of each of first to fourth frequency bands A-D (S102). Here, the integrated values of first to third frequency bands A-C are added in correspondence with crank angles. As shown in FIG. 7, of the calculated integrated values, the integrated values of fourth frequency band D represent the vibration waveform of engine 100.

As an integrated value for every five degrees is used to detect a vibration waveform, it becomes possible to detect a vibration waveform of which delicate variations are suppressed. This makes it easier to compare a detected vibration waveform with the knock waveform model.

Based on the calculated integrated values, peak value P of the integrated values in the synthesized waveform of first to third frequency bands A-C is calculated (S104). Here, as the bandwidth of first to third frequency bands A-C is uniformly set to a width as much as necessary to include vibrations attributed to knocking, the bandwidth is prevented from becoming unnecessarily broad. Thus, the noises included in the detected vibrations can be suppressed. Accordingly, erroneous calculation of peak value P due to the noises can be suppressed.

Integrated values in fourth frequency band D is divided by the calculated peak value P, whereby the vibration waveform is normalized (S106). Here, it is assumed that the integrated value for 20° to 25° (the integrated value corresponding to the fifth integrated value from the left in FIG. 7) is calculated as peak value P, by which each integrated value is divided, and the vibration waveform is normalized. By the normalization, vibration magnitude in the vibration waveform is represented by a dimensionless number of 0 to 1. Thus, the detected vibration waveform can be compared with the knock waveform model regardless of the vibration magnitude. This can eliminate the necessity of storing a large number of knock waveform models corresponding to the magnitude of vibrations and thus, facilitates preparation of the knock waveform model.

Figure 8:
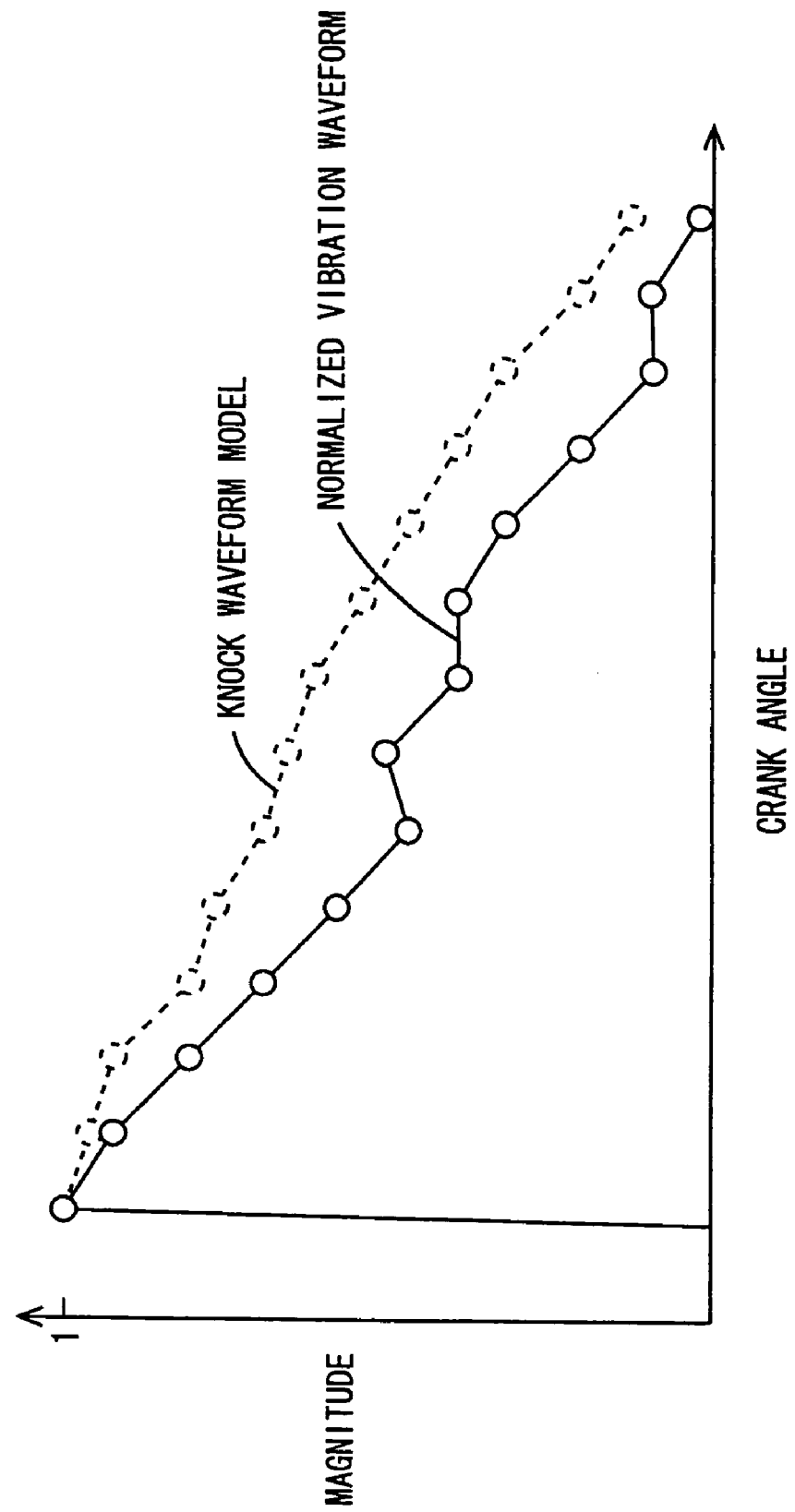
FIG. 8 is a diagram representing timings for comparing the normalized vibration waveform with the knock waveform model.

As shown in FIG. 8, a timing at which the magnitude of the vibrations becomes maximum in the normalized vibration waveform and a timing at which the magnitude of the vibrations becomes maximum in the knock waveform model are matched, and in this state, a deviation in absolute value $\Delta S(I)$ between the normalized vibration waveform and the knock waveform model is calculated for each crank angle. Sum $\Sigma \Delta S(I)$ of such $\Delta S(I)$ and value S representing a magnitude of vibrations in knock waveform model that is integrated by crank angle are used to calculate the coefficient of correlation $K=(S-\Sigma \Delta S(I))/S$ (S108). This allows numerical representation of a degree of matching between the detected vibration waveform and the knock waveform model, and hence allows objective determination. Additionally, by comparing the vibration waveform with the knock waveform model, whether the vibrations are attributed to knocking or not can be analyzed from the behavior of the vibrations, such as trend of attenuation of the vibrations.

The product of the calculated coefficient of correlation K and peak value P is divided by the BGL to calculate knock intensity N (S110). Thus, whether the vibrations of engine 100 are attributed to knocking can be analyzed in greater detail, using vibration magnitude in addition to the degree of matching between the detected vibration waveform and the knock waveform model. Here, it is assumed that the product of coefficient of correlation K and the integrated value for 20°-25° is divided by BGL to calculate knock intensity N.

If knock intensity N is larger than a predetermined reference value (YES at S112) a determination is made that engine knocks (S114), and a spark retard is introduced (S116), whereby occurrence of knocking is suppressed.

If knock intensity N is not larger than the predetermined reference value (NO at S112), a determination is made that the engine does not knock (S118), and a spark advance is introduced (S120).

As described above, in the knocking determination device according to the present embodiment, the engine ECU extracts vibrations included in first frequency band A, second frequency band B and third frequency band C from the vibrations detected by the knock sensor. The integrated values of the magnitude of vibrations included in first to third frequency bands A-C are calculated for a crank angle of every five degrees, which are further added in correspondence with crank angles. A synthesized waveform is calculated by the addition of integrated values in correspondence with crank angles, and a peak value therein is calculated. Here, the bandwidth of first to third frequency bands A-C is set to a width of a fixed value, irrespective of the frequency bands. Thus, the bandwidth is prevented from becoming unnecessarily broad. Accordingly, noises except for vibrations attributed to knocking are suppressed, and the peak value can be calculated with high accuracy. Based on the peak value, whether knocking occurred or not is determined. Thus, whether knocking occurred or not can be determined with high accuracy.

While the vibration waveform of engine 100 is detected based on the integrated values in fourth frequency band D in the present embodiment, in place of the integrated values in fourth frequency band D, the integrated values in first to third frequency bands A-C may be synthesized by adding for every corresponding crank angle to detect the vibration waveform of engine 100.

Further, in place of peak value P of the integrated values in the synthesized waveform of first to third frequency bands A-C, or in addition to peak value P, the position of peak value P of the integrated values in the synthesized waveform of first to third frequency bands A-C may be calculated. In this case, even when the calculated position of peak value P and the position of the peak value of the integrated values in fourth frequency band D are different, the vibration waveform may be compared with the knock waveform model at a timing at which the peak value of the knock waveform model is matched to the position of peak value P of the integrated values in the synthesized waveform of first to third frequency bands A-C.

Still further, the number of frequency bands used for detecting the vibration waveform is not limited to three, and any number of a plurality of frequency bands can be used.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A knocking determination device for an internal combustion engine, comprising:

a vibration detecting unit that detects vibrations of an internal combustion engine;
an extracting unit that extracts, from said detected vibrations, vibrations at a plurality of frequency bands being identical in bandwidth;
a determining unit that determines whether knocking occurred in said internal combustion engine or not, based on said extracted vibrations;
a detecting unit that detects a vibration waveform with predetermined crank angle intervals, based on said extracted vibrations; and
a storage unit that stores in advance a vibration waveform of said internal combustion engine, wherein
said determining unit determines whether knocking occurred in said internal combustion engine or not, based on a result of comparison between said detected waveform and said stored waveform.

2. The knocking determination device for an internal combustion engine according to claim 1, wherein said stored waveform is a model vibration of said internal combustion engine when said engine knocks.

3. A knocking determination device for an internal combustion engine, comprising:
detecting means for detecting vibrations of an internal combustion engine;
extracting means for extracting, from said detected vibrations, vibrations at a plurality of frequency bands being identical in bandwidth;
determining means for determining whether knocking occurred in said internal combustion engine or not, based on said extracted vibrations;
detecting means for detecting a vibration waveform with predetermined crank angle intervals, based on said extracted vibrations; and
storing means for storing in advance a vibration waveform of said internal combustion engine, wherein
said determining means includes means for determining whether knocking occurred in said internal combustion engine or not, based on a result of comparison between said detected waveform and said stored waveform.

* * * * *